(No Model.) 2 Sheets—Sheet 1.
J. F. SANDERS.
Vacuum Dredge.
No. 243,462. Patented June 28, 1881.
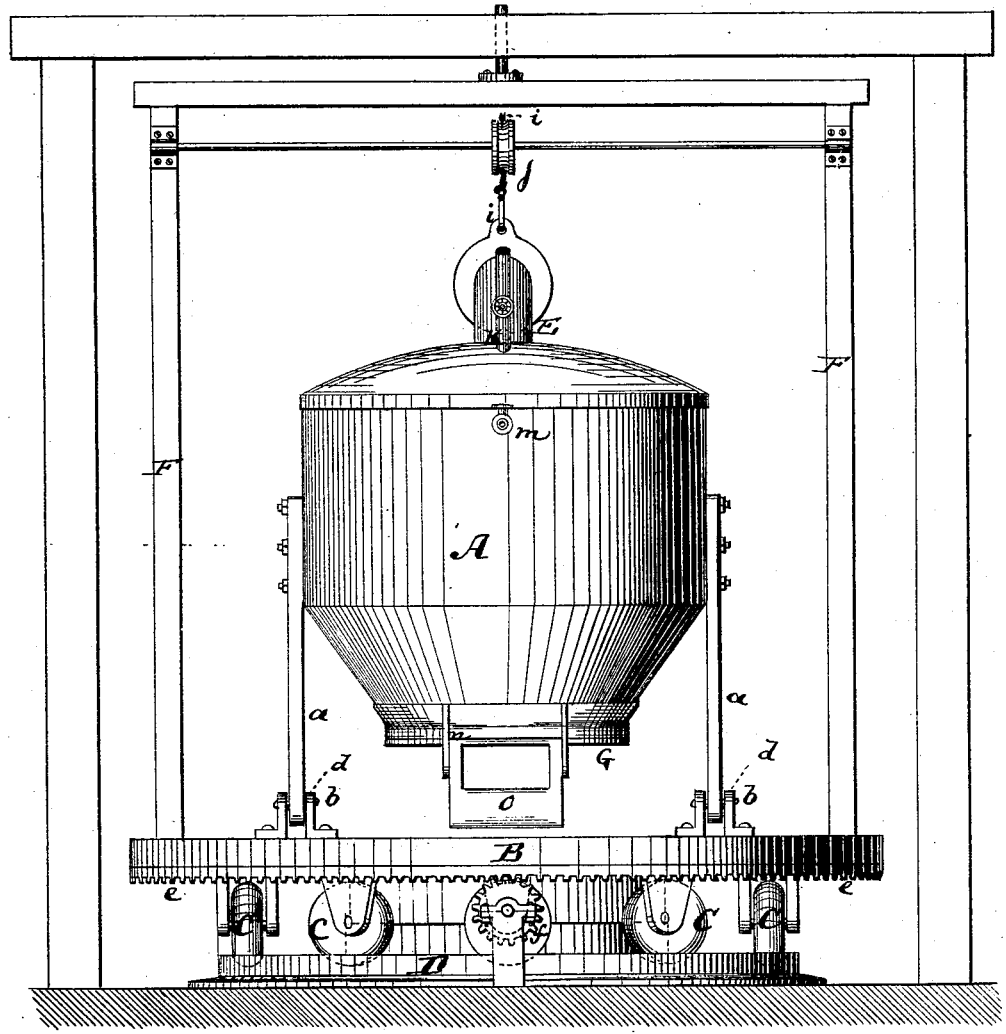
Fig: 1
Witnesses
John C. Tunbridge
Henry F. Parker
Inventor:
John F. Sanders
by his attorney
A. v. Briesen

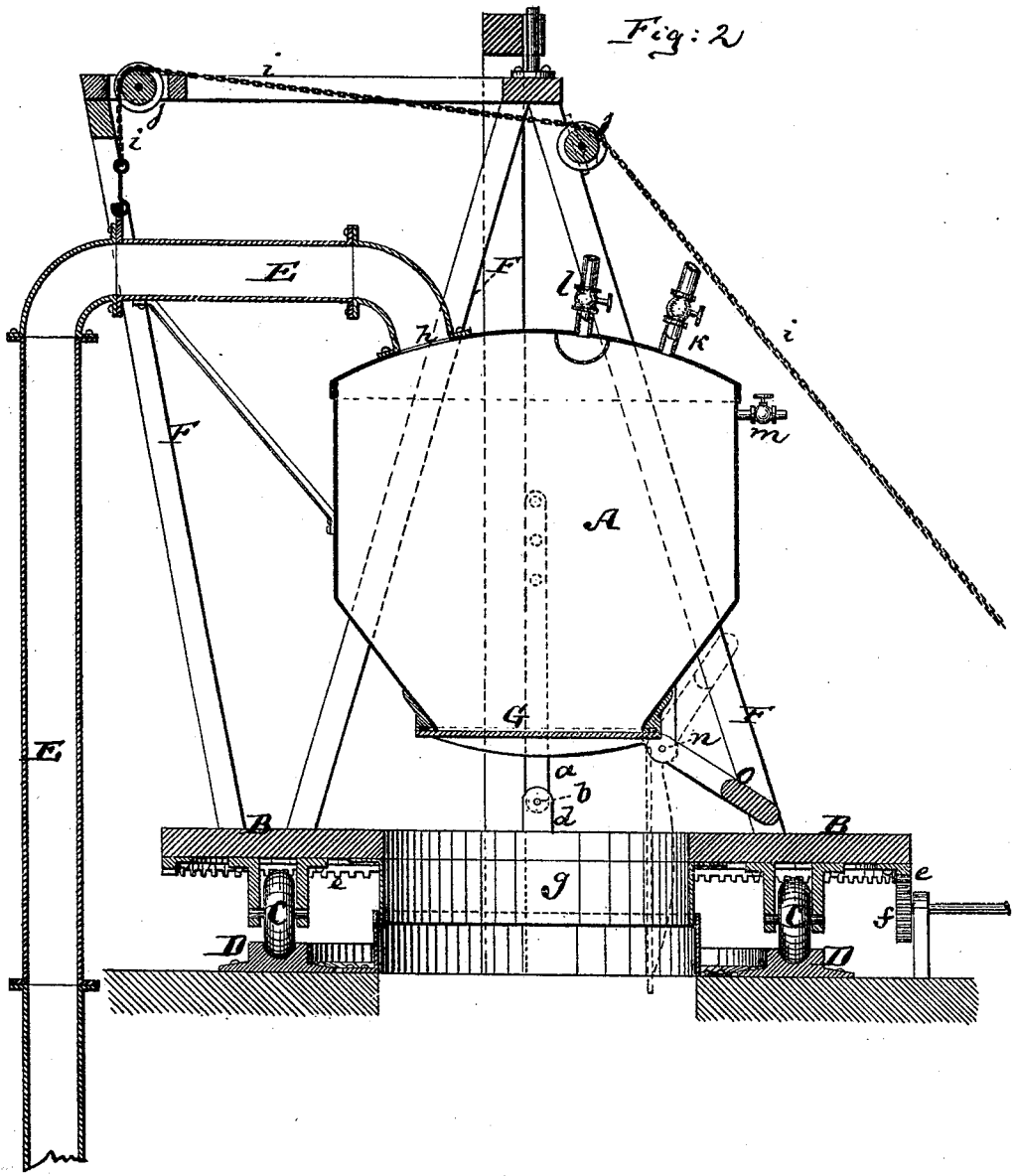

UNITED STATES PATENT OFFICE.

JOHN F. SANDERS, OF OGDEN, UTAH TERRITORY.

VACUUM-DREDGE.

SPECIFICATION forming part of Letters Patent No. 243,462, dated June 28, 1881.

Application filed April 16, 1881. (No model.)

*To all whom it may concern:*

Be it known that I, JOHN F. SANDERS, of Ogden, in the county of Weber and Territory of Utah, have invented an Improved Vacuum-Dredge, of which the following is a specification.

Figure 1 is a front elevation, and Fig. 2 a vertical central section, of my improved vacuum-dredge.

The object of this invention is to so construct the vacuum-dredge, which is an apparatus intended to collect gravel or the like, which is taken up by suction, that it will retain as long as desired all the gravel that has entered it, and so, also, that it can be made practically self-discharging and self-adjusting.

Heretofore such vacuum-dredges were mostly so constructed that the suction-pipes entered their lower parts. The consequence of this arrangement was that the gravel that entered the vacuum-pan by suction created within the same was liable to flow back out of the pan through the suction-pipe the moment suction ceased, so that much of the labor of collecting the gravel in the vacuum-pan was lost by the back-flow of the gravel from the same.

To overcome this defect, one feature of my present invention consists in elevating the supply or suction pipe above the upper end of the pan, so that whatever gravel or other substance enters the pan will be unable to flow back through the pipe through which it entered.

Another feature of my invention has reference to the construction and arrangement of the discharging-bottom of the pan, which I have provided with a weighted extension, so that it will be and remain self-closing under the act of suction, and remain closed while suction draws the gravel into the pan, but which, the moment suction ceases, will be tilted and opened by the weight of the gravel that rests upon it, and which again, the moment all the gravel has been discharged, will automatically swing against the bottom of the pan and close the same for further operation.

My invention also consists in hinging my pan at a point which is lower than the body of the pan, so that it will be capable of swinging with greater freedom and of holding its discharging-mouth above the opening through which its contents must finally pass. If the pan is pivoted at a point within its vertical extent it requires but little movement so to swing it that it will afterward not discharge centrally, but at a point away from the opening that is prepared for the passage of its contents.

Finally, my invention consists in hanging this pivoted pan on a turn-table, all as hereinafter described.

In the drawings, the letter A represents a vacuum-pan of suitable form and size. This pan is provided with downwardly-extending arms $a$ at its sides, which, at a point below the level of the bottom of the pan, are pivoted by pins $b$ in upwardly-projecting ears or posts $d$, that are fastened to an annular platform, B. This annular platform rests on rollers C, that travel in an annular grooved or railed track, D, so that the vacuum-pan A is virtually mounted on a turn-table, permitting it to be revolved horizontally in any suitable manner. To this end the lower, the outer, or the upper edge of the platform B may be provided with teeth $e$ and engaged into a pinion, $f$, which is mounted on a shaft, to which rotary motion may be imparted to turn the table or platform B, and with it the pan.

The circular opening $g$ in the center of the platform B is directly below the vacuum-pan when the same stands in an upright position, as shown in Fig. 2, and this opening $g$ is intended to allow the contents of the vacuum-pan to pass through it when they are discharged from the pan.

It will be readily seen that by pivoting the pan at $b$ at a point below its body the swinging of the pan will but little vary the relative position of the discharge-opening in the bottom of the pan and the circular opening $g$, leaving the pan always above that opening $g$ that leads into a suitable receiving-vessel. Such a vessel in most cases will be an amalgamating apparatus of some kind, as the pan is intended mostly to be used in collecting gravel which contains precious metals, to convey the same to apparatus in which the precious metal can be separated from the useless parts of the gravel.

E is the pipe for supplying the pan with the gravel. This pipe leads into the upper part of the pan, as shown at $h$, and is so arranged that none of the contents of the pan can flow back from it through the pipe E. In other words, it is essential that the pipe E at some part of its extent be higher than the pan A. The pipe E is connected with a chain, $i$, that passes over suitable rollers, $j$, which are hung in a frame-work, F, that projects upward from the platform B, and by means of this chain $i$ the position of the vacuum-pan and of the pipe may be varied and the pan swung on its pivot $b$ or allowed to swing on it.

$k$ is the steam-supply pipe, leading, by preference, into the upper part of the pan A. $l$ is the water-supply pipe, leading, preferably, also into the upper part of the pan A. $m$ is an air-pipe. Each of these pipes has a suitable cock near the pan, to enable the attendant to readily close the one or open the other, as may suit his convenience. The bottom of the pan is closed by a plate, G, which is hinged at $n$, and provided with a projecting weight at the pivoted end, as at $o$. This weight is so arranged as to swing the bottom G shut against the pan, but to allow it to swing open, as indicated by dotted lines in Fig. 2, under the influence of the weight of the gravel that is contained within the pan when the latter is filled or nearly so.

The operation of the apparatus is as follows: The pan A is first turned with the turn-table to bring the lower end of the pipe E in contact with the gravel which is to be sucked up. Steam is then let into the pan A by opening the valve of the pipe $k$, the attendant meanwhile, if necessary, holding his foot on the weighted extension $o$, so as to prevent the steam-pressure from opening the bottom G, although in most cases the steam-pressure will not be sufficient to throw the bottom open. When the pan has been filled with the proper supply of steam the valve in the pipe $k$ is closed, and that in the pipe $l$ opened for a very short period, allowing a stream of water to flow in small jets into the pan, causing the steam to condense and creating a vacuum in the pan, under the influence of which the gravel, with which the lower end of the pipe E is in contact, will be caused to enter the pan. When the pan is filled, or sufficiently filled for the purpose, the attendant opens the valve in the air-pipe $m$, thereby destroying the vacuum effectually and allowing the weight of the gravel contained in the pan to open the bottom G, whereupon the contents of the pan will flow out into the prepared receptacle. As soon as the pan has become empty the bottom G will, under the influence of the weighted arm $o$, swing back to the pan and close the same, and the operation is then repeated ad libitum. As in the act of sucking up the gravel the bed of gravel recedes from under the pipe E, the latter follows the gravel and causes the vacuum-pan to swing on its pivot $b$, the chain $i$ being properly slackened to permit this swinging to take place; but after the pan has been filled, and in fact either before or after it is to be refilled, it may be drawn back into a vertical position by pulling on the chain $i$.

I do not broadly claim a hinged receiver in a dredging apparatus, nor a hinged receiver having folding bottom, nor one pivoted in an annular frame that is swiveled to a pivoted discharge-pipe, as in Patent No. 238,975.

I claim—

1. The vacuum-dredge composed of the vacuum-pan A, which is provided with a hinged bottom for the discharge of its contents and with steam and water supply pipes, in combination with the gravel-supply pipe E, which reaches higher than the pan A, substantially as herein shown and described.

2. The combination of the vacuum-pan A, having steam and water supply pipes, with the swinging bottom G, having weighted extension $o$, all arranged so that said bottom will be closed under the influence of the weight $o$ and opened when the pan is properly filled and the vacuum therein destroyed, substantially as specified.

3. The combination of the vacuum-pan A and its supply-pipe E with the downwardly-extending posts $a$ and with the supporting-pivots $b$, said pivots being lower than the pan, substantially as specified.

4. The vacuum-pan A, provided with the dredge-pipe E, and combined with the annular turn-table B, and with the supports $b$, which are on a plane below that of the pan, substantially as specified.

5. The combination of the turn-table B, carrying the pivoted vacuum-pan A, and its suction-pipe E, with the frame F erected on said turn-table, and with the tackle $i\ j$ for controlling the inclination of the pan A and pipe E, substantially as described.

JOHN F. SANDERS.

Witnesses:
WILLY G. E. SCHULTZ,
WILLIAM H. C. SMITH.